United States Patent
Marianowski

(12) 
(10) Patent No.: US 6,261,710 B1
(45) Date of Patent: Jul. 17, 2001

(54) SHEET METAL BIPOLAR PLATE DESIGN FOR POLYMER ELECTROLYTE MEMBRANE FUEL CELLS

(75) Inventor: Leonard G. Marianowski, Mount Prospect, IL (US)

(73) Assignee: Institute of Gas Technology, Des Plaines, IL (US)

( * ) Notice: Subject to any disclaimer, the term of this patent is extended or adjusted under 35 U.S.C. 154(b) by 0 days.

(21) Appl. No.: 09/199,958

(22) Filed: Nov. 25, 1998

(51) Int. Cl.[7] .............................. H01M 2/00; H01M 2/18
(52) U.S. Cl. .............................. 429/34; 429/26; 429/35; 429/38; 429/39
(58) Field of Search .................. 429/26, 34, 35, 429/38, 39

(56) References Cited

U.S. PATENT DOCUMENTS

| | | |
|---|---|---|
| 4,175,165 | 11/1979 | Adlhart . |
| 4,678,724 | 7/1987 | McElroy . |
| 4,963,442 | 10/1990 | Marianowski et al. . |
| 4,977,041 | 12/1990 | Shiozawa et al. . |
| 5,077,148 | 12/1991 | Schora et al. . |
| 5,227,256 | 7/1993 | Marianowski et al. . |
| 5,342,706 | 8/1994 | Marianowski et al. . |
| 5,470,679 | 11/1995 | Lund et al. . |
| 5,482,792 | 1/1996 | Faita et al. . |
| 5,578,388 | 11/1996 | Faita et al. . |
| 5,606,641 | 2/1997 | Bucaille . |
| 5,616,431 | 4/1997 | Kusunoki et al. . |
| 5,776,624 | 7/1998 | Neutzler . |
| 5,922,485 | * 7/1999 | Enami ................................ 429/26 |
| 6,066,409 | * 5/2000 | Ronne et al. ...................... 429/39 |
| 6,080,502 | * 6/2000 | Nolscher et al. .................. 429/34 |

FOREIGN PATENT DOCUMENTS

| | | |
|---|---|---|
| 2 336 712 | 10/1999 | (GB) . |
| 10-233220 | 9/1998 | (JP) . |
| 10-308227 | 11/1998 | (JP) . |
| 95/22179 | 8/1995 | (WO) . |
| 97/50138 | 12/1997 | (WO) . |
| 98/26464 | 6/1998 | (WO) . |

OTHER PUBLICATIONS

Merriam–Webster's Collegiate Dictionary, 10th ed., p. 780. No Month, 1998.

* cited by examiner

Primary Examiner—Gabrielle Brouillette
Assistant Examiner—Tracy Dove
(74) Attorney, Agent, or Firm—Pauley Petersen Kinne & Fejer

(57) ABSTRACT

A separator plate for a polymer electrolyte membrane fuel cell stack constructed of at least two coextensive sheet metal elements shaped to promote the distribution of reactant gases to the electrodes of the fuel cell units of the fuel cell stack. The coextensive sheet metal elements are nestled together and form a coolant flow space therebetween.

19 Claims, 4 Drawing Sheets

SHEET METAL BIPOLAR PLATE DESIGN FOR POLYMER ELECTROLYTE MEMBRANE FUEL CELLS

BACKGROUND OF THE INVENTION

1. Field of the Invention

This invention relates to a bipolar separator plate for use in polymer electrolyte membrane (PEM) fuel cells. More particularly, this invention relates to a liquid cooled, bipolar sheet metal separator plate for use in polymer electrolyte membrane fuel cells. Although the concept of this invention may be applied to bipolar separator plates for a variety of fuel cell designs, it is particularly suitable for use in polymer electrolyte membrane fuel cell stacks in which the fuel and oxidant are provided to each of the fuel cell units comprising the fuel cell stack through internal manifolds.

2. Description of Prior Art

There are a number of fuel cell systems currently in existence and/or under development which have been designed and are proposed for use in a variety of applications including power generation, automobiles, and other applications where environmental pollution is to be avoided. These include molten carbonate fuel cells, solid oxide fuel cells, phosphoric acid fuel cells, and polymer electrolyte membrane fuel cells. One issue associated with successful operation of each of these fuel cell types is the control of fuel cell temperature and the removal of products generated by the electrochemical reactions from within the fuel cell.

Polymer electrolyte membrane fuel cells are particularly advantageous because they are capable of providing potentially high energy output while possessing both low weight and low volume. Polymer electrolyte membrane fuel cells are well known in the art. Each such fuel cell comprises a "membrane-electrode-assembly" comprising a thin, proton-conductive, polymer membrane-electrolyte having an anode electrode film formed on one face thereof and a cathode electrode film formed on the opposite face thereof. In general, such membrane-electrolytes are made from ion exchange resins, and typically comprise a perflourinated sulfonic acid polymer such as NAFION™ available from E.I. DuPont DeNemours & Co. The anode and cathode films typically comprise finely divided carbon particles, very finely divided catalytic particles supported on the internal and external surfaces of the carbon particles, and proton-conductive material intermingled with the catalytic and carbon particles, or catalytic particles dispersed throughout a polytetrafluoroethylene (PTFE) binder.

The membrane-electrode-assembly for each fuel cell is sandwiched between a pair of electrically conductive elements which serve as current collectors for the anode/cathode and frequently contain an array of grooves in the faces thereof for distributing the fuel cell gaseous reactants over the surfaces of the respective anode and cathode.

Commercially viable fuel cell stacks may contain up to about 600 individual fuel cells (or fuel cell units), each having a planar area up to several square feet. In a fuel cell stack, a plurality of fuel cell units are stacked together in electrical series, separated between the anode electrode of one fuel cell unit and the cathode electrode of an adjacent fuel cell unit by an impermeable, electrically conductive, bipolar separator plate which provides reactant gas distribution on both external faces thereof, which conducts electrical current between the anode of one cell and the cathode of the adjacent cell in the stack, and which, in most cases, includes the internal passages therein which are defined by internal heat exchange faces and through which coolant flows to remove heat from the stack. Such a bipolar separator plate is taught, for example, by U.S. Pat. No. 5,776,624. In such fuel cell stacks, the fuel is introduced between one face of the separator plate and the anode side of the electrolyte and oxidant is introduced between the other face of the separator plate and the cathode side of a second electrolyte.

Cell stacks containing 600 cells can be up to several feet tall, presenting serious problems with respect to maintaining cell integrity during heat-up and operation of the fuel cell stack. Due to thermal gradients between the cell assembly and cell operating conditions, differential thermal expansions, and the necessary strength of materials required for the various components, close tolerances and very difficult engineering problems are presented. In this regard, cell temperature control is highly significant and, if it is not accomplished with a minimum temperature gradient, uniform current density will not be maintainable, and degradation of the cell will occur.

In addition to temperature considerations, fuel cell stack integrity is also a function of the physical dimensions of the stack. The larger the fuel cell stack, the more difficult it becomes to maintain stack integrity and operation. Accordingly, in addition to temperature control, for a given electrical output which is a function of the number of fuel cell units comprising the fuel cell stack, it is desirable that the fuel cell stack dimensions, in particular, the fuel cell stack height be as small as possible for a given electrical output.

SUMMARY OF THE INVENTION

Accordingly, it is one object of this invention to provide a polymer electrolyte membrane fuel cell stack having a compact design such that the number of fuel cell units per inch of fuel cell stack height for a given electrical output is increased over conventional polymer electrolyte membrane fuel cell stacks.

It is another object of this invention to provide a compact, water cooled bipolar separator plate for use in polymer electrolyte membrane fuel cell stacks.

These and other objects of this invention are achieved by a polymer electrolyte membrane fuel cell stack comprising a plurality of polymer electrolyte membrane fuel cell units, each of which comprises a membrane-electrode-assembly comprising a thin, proton conductive, polymer membrane electrolyte having an anode electrode film on one face thereof and a cathode electrode film on an opposite face thereof, an anode current collector on said anode electrode film side of said membrane-electrode-assembly and a cathode current collector on said cathode electrode film side of said membrane-electrode-assembly. Disposed between the anode electrode film side of the membrane-electrode assembly of one fuel cell unit and the cathode electrode film side of the membrane-electrode-assembly of an adjacent fuel cell unit is a separator plate having guide means for distributing fuel and oxidant gases to the anode electrode and the cathode electrode, respectively. The separator plate is constructed of at least two coextensive sheet metal elements having substantially identically shaped guide means, which coextensive sheet metal elements are nestled together and form a coolant flow space therebetween.

In accordance with one preferred embodiment of this invention, the guide means comprise a plurality of corrugations formed in the two sheet metal elements. In accordance with another preferred embodiment of this invention, the guide means comprise a plurality of dimples formed in the two sheet metal elements. Although nestled together, the two coextensive sheet metal elements are maintained at a small distance from one another, thereby forming the coolant flow space therebetween. The distance between the nestled coextensive sheet metal elements is maintained by separation means such as a plurality of nodules or bumps disposed on the face of at least one of the coextensive sheet metal elements facing another of said coextensive sheet metal elements or other means for maintaining the separation between the coextensive sheet metal elements while still providing good electrical conductivity between the coextensive sheet metal elements.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Figure 1:
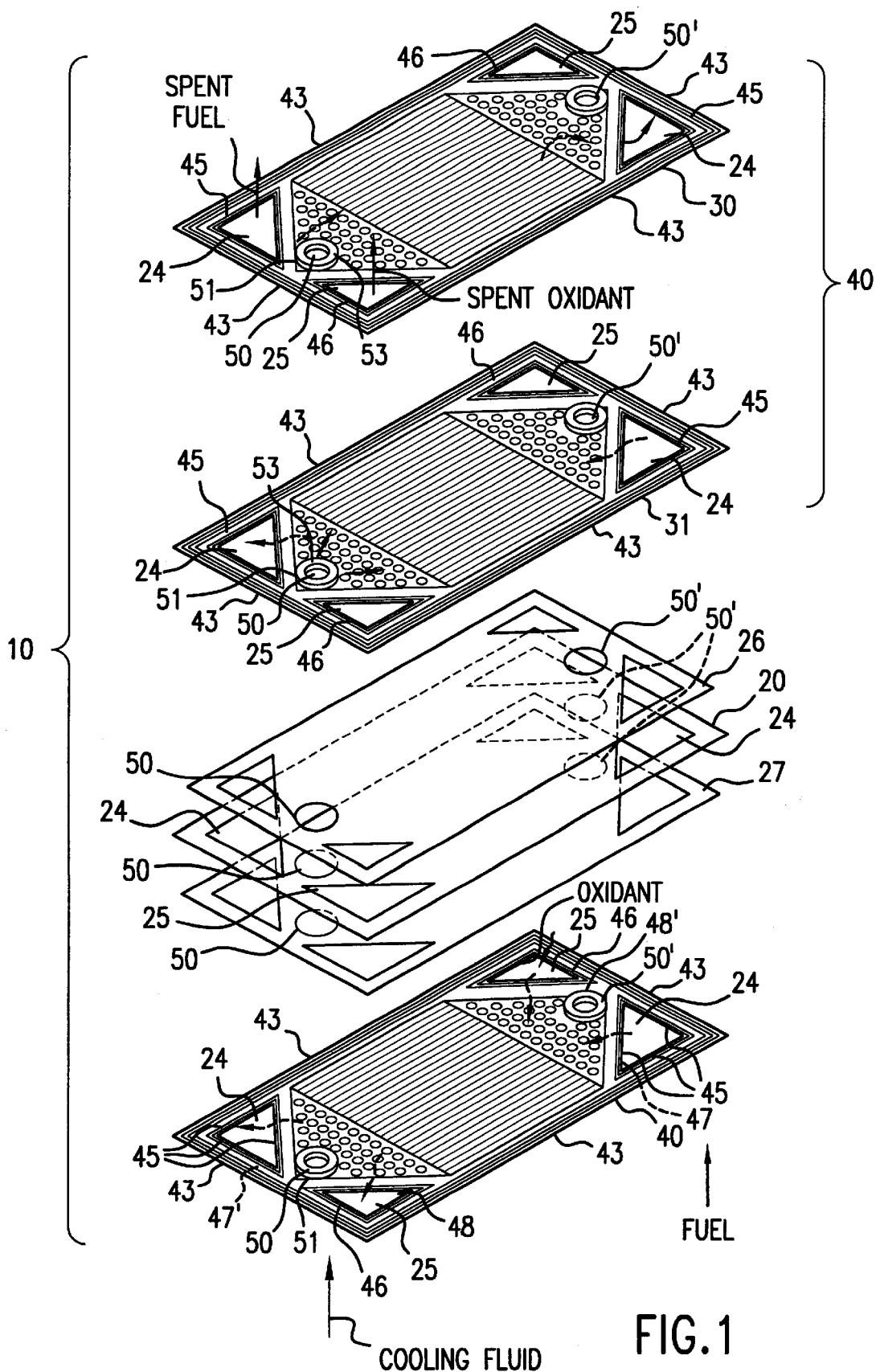
FIG. 1 is an exploded perspective view of a portion of a polymer electrolyte membrane fuel cell stack including separator plates in accordance with one embodiment of this invention.
Figure 2:
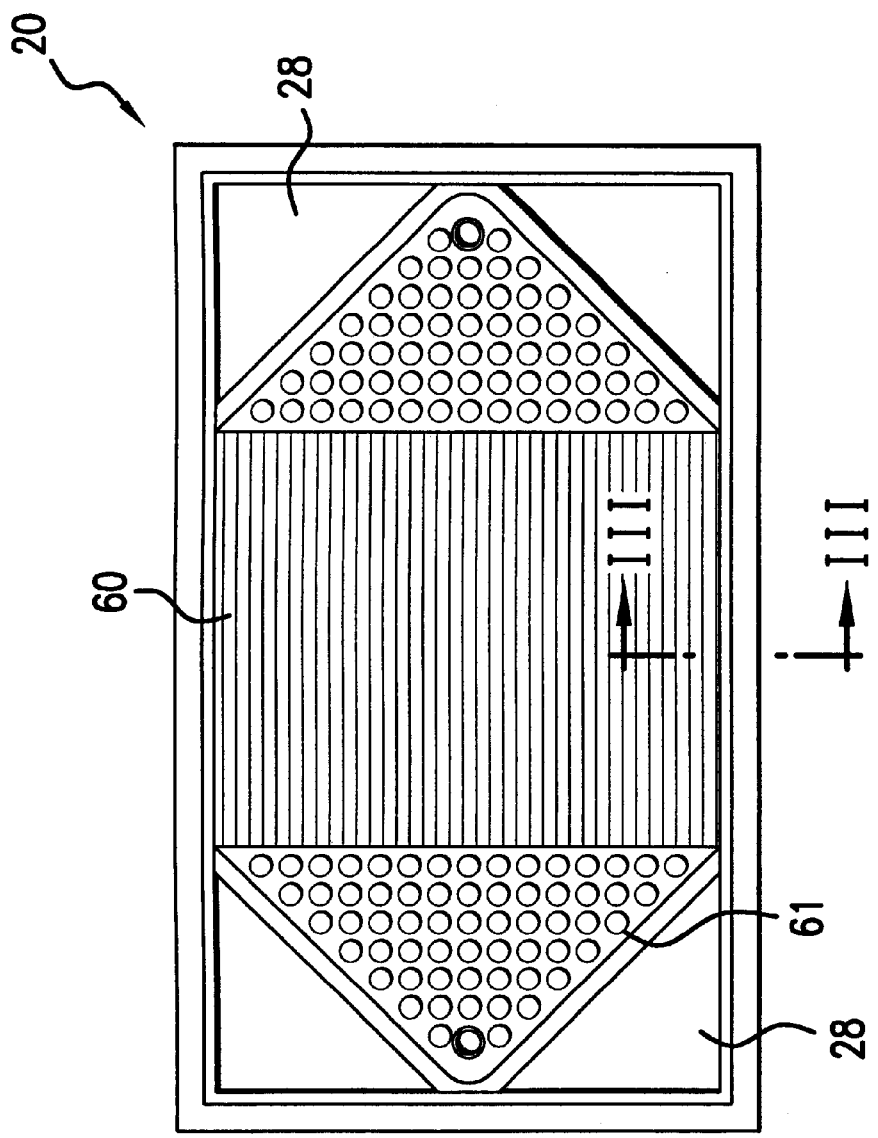
FIG. 2 is a top view of a separator plate in accordance with one embodiment of this invention for a polymer electrolyte membrane fuel cell.

FIG. 1 is an exploded perspective view of a portion of a polymer electrolyte membrane fuel cell stack 10 in accordance with one embodiment of this invention. Polymer electrolyte membrane fuel cell stack 10 comprises a plurality of polymer electrolyte membrane fuel cell units, each of which comprises a membrane-electrode-assembly (MEA) 20 comprising a thin, proton conductive, polymer membrane-electrolyte having an anode electrode film (anode) formed on one face thereof and a cathode electrode film (cathode) formed on the opposite face thereof, which membrane-electrode-assembly 20 is sandwiched between electrically conductive elements 26, 27 which serve as current collectors and gas diffusion layers for the anode and cathode. Separator plate 40 separates adjacent polymer electrolyte membrane fuel cell units and is disposed between the anode side of one said polymer electrolyte membrane fuel cell unit and the cathode side of the adjacent said polymer electrolyte membrane fuel cell unit. Separator plate 40 is formed with guide means for distribution of fuel and oxidant reactant gases to the anode and the cathode, respectively. Such guide means may take any suitable form but, in accordance with one preferred embodiment of this invention, comprise a plurality of corrugations 60, as shown in FIG. 2, which form channels for distribution of the reactant gases to the electrodes. In accordance with another embodiment of this invention, said guide means comprise a plurality of dimples 61, also shown in FIG. 2. As shown in FIG. 2, separator plate 40 may comprise a plurality of guide means, such as a combination of corrugations and dimples.

In accordance with a particularly preferred embodiment of this invention, the polymer electrolyte membrane fuel cell stack of this invention is a fully internal manifolded fuel cell stack whereby the reactant gases are provided to the electrodes and the reaction products are withdrawn from the reaction zones within the fuel cell stack through internal manifolds formed by aligned perforations disposed within at least a separator plate and the polymer electrolyte membranes. Internal manifolded fuel cells are taught by U.S. Pat. No. 4,963,442, U.S. Pat. No. 5,077,148, U.S. Pat. No. 5,227,256, and U.S. Pat. No. 5,342,706, the teachings of which are all incorporated herein by reference. It will, however, be apparent to those skilled in the art that other fuel cell configurations, including externally manifolded fuel cell stacks, are suitable for use with the separator plate of this invention.

As shown in FIG. 1, a fuel cell unit of a polymer electrolyte membrane fuel cell stack in accordance with one embodiment of this invention comprises separator plates 40, membrane electrode assembly 20 comprising a thin, proton-conductive, polymer membrane-electrolyte having an anode electrode film formed on one face thereof and a cathode electrode film formed on the opposite face thereof, anode current collector 26, and cathode current collector 27. Separator plates 40, membrane-electrode-assembly 20, and current collectors 26, 27 extend to the edge region of the cell and form seals at both faces of separator plates 40 between membrane-electrode-assembly 20 and/or current collectors 26, 27 around the entire periphery of the cell in peripheral seal areas 43. Peripheral seal structures 43 extend upwardly and downwardly from the general plane of separator plate 40 to provide contact with the periphery of current collectors 26, 27 and/or membrane-electrode-assembly 20. Separator plates 40, membrane-electrode-assembly 20, and current collectors 26, 27 are each penetrated by corresponding fuel manifold holes 24, one for supply and one for removal, and oxidant manifold holes 25, one for supply and one for removal. While the manifold holes shown in FIG. 1 are a preferred triangular shape providing easily formed straight thin sheet manifold seal areas, the manifold holes may be round, rectangular, or any other desired shape. The manifold holes shown in FIG. 1 are single openings, but partitions may be used in the single openings as desired to direct gas flow across the cell reactant chambers. Fuel manifold seal areas 45 and oxidant manifold seal areas 46 extend both upwardly and downwardly from the general plane of separator plate 40 to provide contact with the current collectors 26, 27 and/or membrane-electrode-assembly 20 to form seals between the membrane-electrode-assembly and the adjacent current collectors 26, 27.

Oxidant manifold holes 25 are sealed by oxidant manifold seals 46 providing oxidant flow only to and from the cathode chamber adjacent the upper face of separator plate 40 by oxidant supply openings 48 and oxidant exhaust openings 48' and preventing gas flow to or from the anode chamber while fuel manifold holes 24 are sealed by fuel manifold seals 45 providing fuel flow only to and from the anode chamber adjacent the lower face of separator plate 40 by fuel supply openings 47 and fuel exhaust openings 47' and preventing gas flow to or from the cathode chamber. Although shown as straight pressed sheet metal structures, manifold seals 45, 46 can be any desired shape or structure to prevent gas flow. Manifold seals 45, 46 form a double seal between fuel manifold hole 24 and oxidant manifold hole 25.

Figure 3:
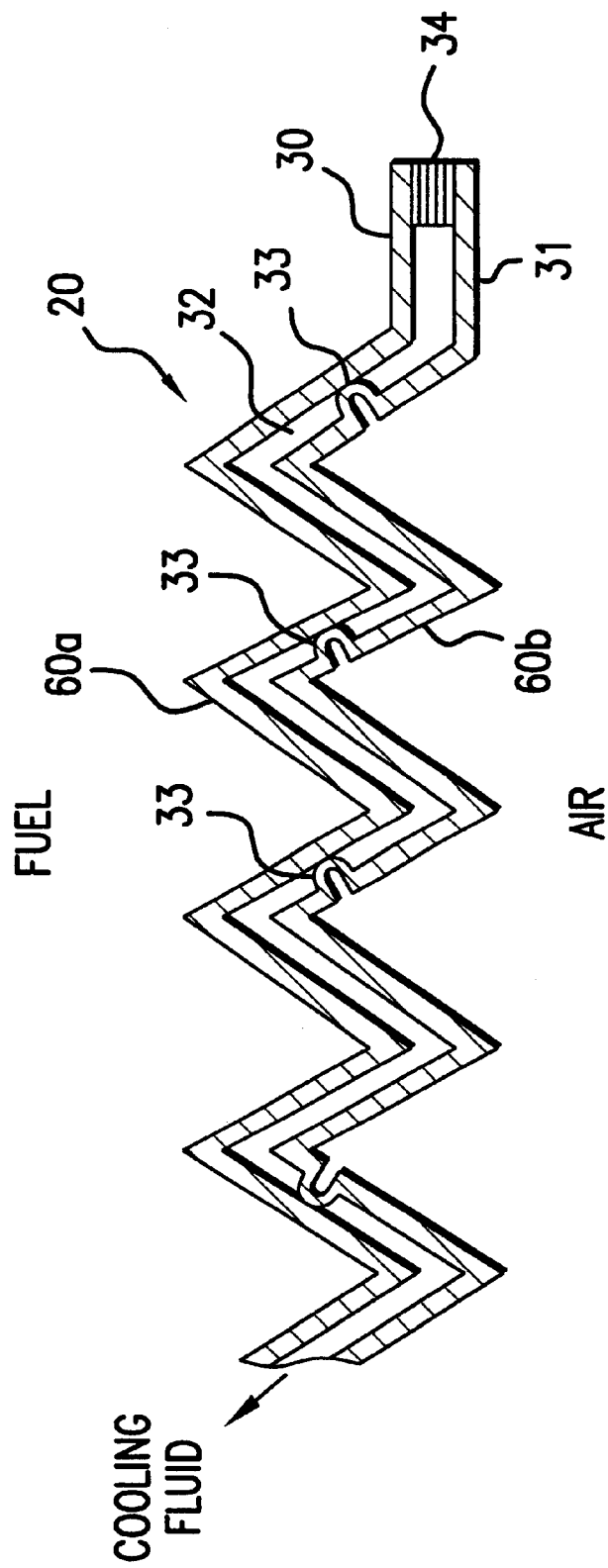
FIG. 3 is a cross-sectional view of a portion of the separator plate shown in FIG. 2 in the direction of arrows III—III.

As previously stated, a substantial problem which must be addressed during the operation of polymer electrolyte membrane fuel cell stacks is the control of fuel cell temperatures generated by the electrochemical reactions of the fuel and oxidant reactants within the fuel cell units comprising the fuel cell stack. This objective is achieved by a separator plate 40 in accordance with this invention comprising at least two coextensive sheet metal elements 30, 31, as shown in FIGS. 1 and 3, having substantially identically shaped guide means, for example, corrugations 60a and 60b, which at least two coextensive sheet metal elements 30, 31 are nestled together and form a coolant flow space 32 therebetween. The coolant flow space 32 is formed by maintaining the at least two coextensive nestled sheet metal elements 30, 31 at a distance from each other. Such distance is maintained in accordance with one particularly preferred embodiment of this invention by the presence of a plurality of bumps or nodules 33 on a sheet metal element facing face of at least one of the two coextensive nestled sheet metal elements 30, 31. It will be apparent to those skilled in the art that such bumps or nodules 33 may be disposed on the sheet metal element facing face of both of the coextensive nestled sheet metal elements 30, 31. In addition, it will be apparent to those skilled in the art that welding or brazing at these points may be desirable to promote better electrical conductivity. It will also be apparent to those skilled in the art that a separator plate 40 comprising more than two coextensive nestled sheet metal elements whereby a coolant flow space is maintained between each of the individual sheet metal elements may also be employed in a polymer electrolyte membrane fuel cell stack in accordance with this invention.

In order to provide coolant to coolant flow space 32, separator plate 40, membrane-electrode-assembly 20, and current collectors 26, 27 are provided with coolant fluid manifold openings 50, 50', for input and output of cooling fluid. Coolant fluid manifold sealant areas 51 extend on both faces from the general plane of separator plate 40 to provide contact for forming seals between separator plate 40 and membrane-electrode-assembly 20 and/or current collectors 26, 27 and define a coolant fluid manifold. Coolant fluid manifold openings 50, 50' are the same diameter in each of the cell components to allow the flat surface of the coolant fluid manifold seal areas 51 to force contact between membrane-electrode-assembly 20 and anode current collector 26 on one side and between membrane-electrode-assembly 20 and cathode current collector 27 on the other side to form a seal surrounding the coolant fluid manifold. The side walls of the extended coolant fluid manifold seal areas 51 are solid in separator plates 40 and, thus, preclude entry of cooling fluid into either the anode chamber or the cathode chamber. Coolant fluid openings 53 in the side walls of the extended coolant fluid manifold seal areas 51 provide for communication between coolant fluid manifold openings 50, 50' and coolant flow space 32.

Another object of this invention is to provide a fuel cell stack having a higher power density than conventional fuel cell stacks. By nestling the sheet metal elements comprising the bipolar separator plate in accordance with this invention, it is possible to provide a fuel cell stack made up of 15–30 fuel cell units per inch of fuel cell stack. That is, a one foot high fuel cell stack of polymer electrolyte membrane fuel cells in accordance with this invention could contain up to 360 fuel cell units. If each fuel cell unit has an area of about one square foot, then a power density of 86,400 watts 1 ft$^3$, or 3,050 watts per liter is obtained (360 fuel cell units×400 amps per foot squared×0.6 v/cell).

Separator plate 40, as previously stated, comprises at least two coextensive sheet metal elements 30, 31 which are nestled together and form a coolant flow space 32 therebetween. The distance between coextensive sheet metal elements 30, 31 is such as to maintain as low a coolant fluid pressure differential through the coolant flow space 32 as possible. In accordance with a preferred embodiment of this invention, the distance between the coextensive sheet metal elements 30, 31 is in the range of about 0.002 inches to about 0.010 inches. Coextensive sheet metal elements 30, 31 are preferably constructed of nickel, stainless steel, high alloy steel, titanium and/or metals coated to prevent corrosion, having a thickness in the range of about 0.002 to about 0.004 inches. Because of the thinness of the sheet metal elements 30, 31, bumps or nodules 33 form maintaining sheet metal elements 30, 31 at a distance from one another are preferably embossed into the sheet metal elements 30, 31. It will be apparent to those skilled in the art, however, that other means for maintaining a distance between sheet metal elements 30, 31 including resistance welding of at least some of the bumps or nodules may also be employed. Resistance welding at least some of the bumps or nodules, in addition to enabling a distance to be maintained between sheet elements 30, 31, also provides for low contact resistance between sheet metal elements 30, 31 which, in turn, inhibits the creation of high electrical resistance across the separator plate 40.

Figure 4:
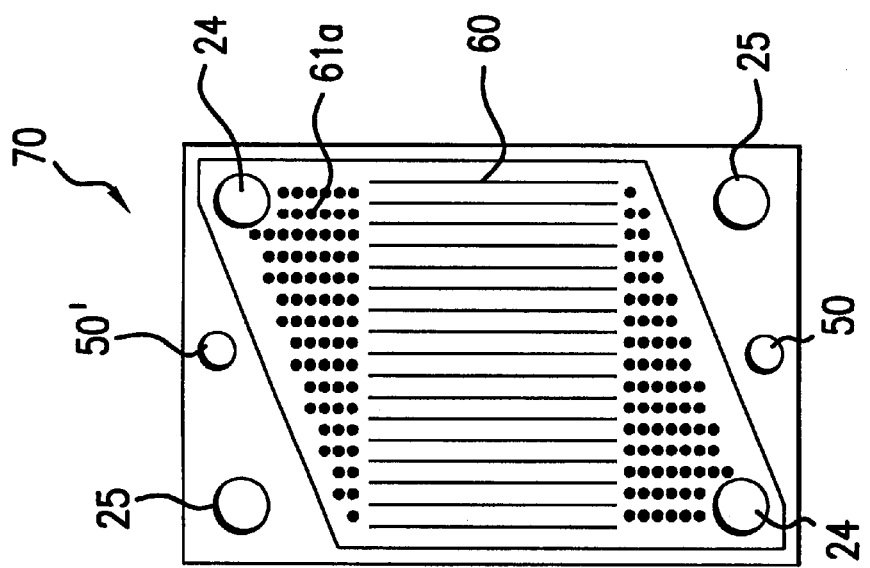
FIG. 4 is a plan view of an electrode facing side of a sheet metal element of a separator plate in accordance with one embodiment of this invention.

FIG. 4 shows a plan view of an electrode facing face of a sheet metal element 70 of a separator plate in accordance with one embodiment of this invention. The center portion of sheet metal element 70 is the active area and comprises guide means in the form of corrugation 60 for distributing gaseous reactants to one of the electrodes of a membrane electrode assembly, which guide means are typically pressed into said sheet metal element 70. The areas of sheet metal element 70 surrounding the active area, which areas provide sealing between the sheet metal elements 70 comprising the separator plate of this invention and between the separator plate and adjacent elements of a fuel cell stack, are generally flat. To assist in the distribution of reactant gases to the electrodes, a portion of the flat areas corresponding generally to the dimpled section of the separator plate shown in FIG. 2 are provided with reactant gas guide means for distributing the reactant gases to the active area of the separator plate. Unlike the dimples 61 shown in FIG. 2 which are normally formed by pressing of the sheet metal element, the guide means shown in FIG. 4, which are also in the form of dimples 61a are applied to the flat portion of the sheet metal element 70 by a print screening process known to those skilled in the art. It will also be apparent to those skilled in the art that other forms of print screened guide means, such as rails, may also be employed and are deemed to be within the scope of this invention.

Figure 5:
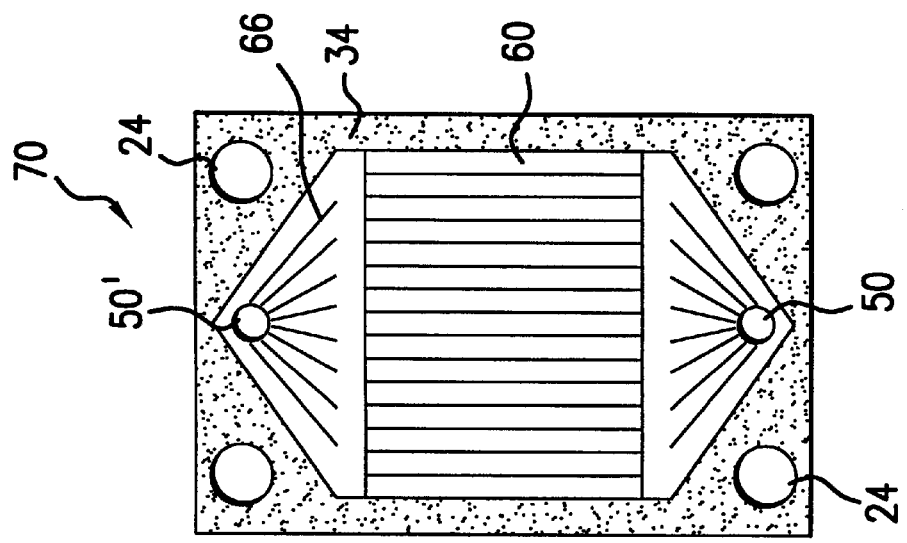
FIG. 5 is a plan view of a cooling fluid side of a sheet metal element of a separator plate in accordance with one embodiment of this invention.

FIG. 5 is a plan view of the cooling fluid facing side of sheet metal element 70, which comprises corrugated and flat sections corresponding to the corrugated and flat sections on the electrode facing side of sheet metal element 70. As shown in FIGS. 4 and 5, the flat portions of sheet metal element 70 comprise the periphery of sheet metal element 70 as well as surround the gas manifold openings 24, 25 and the cooling fluid manifold openings 50, 50'. As shown in FIG. 3, sealing between sheet metal elements 30, 31 is provided by a gasket material 34 which extends around the periphery of the separator plate as well as around the manifold openings formed by the sheet metal elements 30, 31. Gasket material 34 may be any sealing material suitable for performing the function. In accordance with one preferred embodiment of this invention, the gasket is formed by screen printing directly onto the flat portions of sheet metal element 70.

To distribute the cooling fluid entering cooling fluid space 32 through cooling fluid opening 50, the flat portions of sheet metal element 70 on the cooling fluid facing side thereof are provided with cooling fluid guide means which are also screen printed thereon. Said cooling fluid guide means are preferably in the form of dimples or rails 66. In addition to providing means for distributing the cooling fluid, the cooling fluid guide means, as well as the gasket 34, are suitable for maintaining a separation between the sheet metal elements.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a polymer electrolyte membrane fuel cell stack comprising a plurality of polymer electrolyte membrane fuel cell units, each said fuel cell unit having a membrane-electrode-assembly comprising a proton conductive, polymer electrolyte membrane with an anode electrode film on one face and a cathode electrode film on an opposite face, an anode current collector on said anode electrode film side of said membrane-electrode-assembly and a cathode current collector on said cathode film side of said membrane-electrode-assembly, and a separator plate disposed between said anode electrode film side of said membrane-electrode-assembly of one said fuel cell unit and said cathode electrode film side of said membrane-electrode-assembly of an adjacent said fuel cell unit having guide means for distributing fuel and oxidant gases to said anode electrode film side and said cathode electrode film side, respectively, the improvement comprising:

said separator plate constructed of at least two coextensive sheet metal elements having substantially conforming non-linear shapes, said at least two coextensive sheet metal elements separated by a substantially uniform distance over their entire surfaces and forming a coolant flow space therebetween.

2. A polymer electrolyte membrane fuel cell stack in accordance with claim 1, wherein said guide means comprises a plurality of corrugations formed in said at least two sheet metal elements.

3. A polymer electrolyte membrane fuel cell stack in accordance with claim 1, wherein said guide means comprise a plurality of dimples formed in said at least two sheet metal elements.

4. A polymer electrolyte membrane fuel cell stack in accordance with claim 1, wherein said at least two coextensive sheet metal elements are maintained at said substantially uniform distance from each other by a plurality of bumps embossed onto a sheet metal element facing face of at least one of said at least two coextensive sheet metal elements.

5. A polymer electrolyte membrane fuel cell stack in accordance with claim 1, wherein said fuel cell stack comprises in a range of about 15 to 30 polymer electrolyte membrane fuel cell units per inch of fuel cell stack height.

6. A polymer electrolyte membrane fuel cell stack in accordance with claim 1, wherein said substantially uniform distance between said at least two sheet metal elements is in a range of about 0.002 inches to about 0.010 inches.

7. A polymer electrolyte membrane fuel cell stack in accordance with claim 1, wherein said at least two sheet metal elements are constructed of a material selected from the group consisting of nickel, stainless steel, high alloy steel, titanium, and metals coated to prevent corrosion.

8. A polymer electrolyte membrane fuel cell stack in accordance with claim 1 further comprising a plurality of internal manifolds for supplying said fuel and oxidant gases to each of said polymer electrolyte membrane fuel cells and for removal of exhaust gases therefrom.

9. A polymer electrolyte membrane fuel cell stack in accordance with claim 2, wherein said at least two coextensive sheet metal elements are maintained at said substantially uniform distance from each other by a plurality bumps embossed onto a plurality of peaks of said corrugations on a sheet metal element facing face of at least one of said at least two coextensive sheet metal elements.

10. A polymer electrolyte membrane fuel cell stack in accordance with claim 1, wherein said at least two coextensive sheet metal elements are maintained at said substantially uniform distance from each other by a gasket material disposed around a periphery of said coextensive sheet metal elements between said coextensive sheet metal elements.

11. A polymer electrolyte membrane fuel cell stack in accordance with claim 1, wherein said separator plate comprises a centrally disposed active region and said coextensive sheet metal elements comprising said separator plate are substantially flat surrounding said centrally disposed active region.

12. A polymer electrolyte membrane fuel cell stack in accordance with claim 11, wherein said flat portions of said coextensive sheet elements comprise said guide means for distributing fuel and oxidant gases into said centrally disposed active region to said anode electrode film side and said cathode electrode film side, respectively, said guide means comprising at least one of rails and dimples screen printed onto said flat portions.

13. A polymer electrolyte membrane fuel cell stack in accordance with claim 11, wherein said flat portions of said coextensive sheet metal elements comprise cooling fluid guide means on said facing faces of said coextensive sheet metal elements.

14. A polymer electrolyte membrane fuel cell stack in accordance with claim 13, wherein said cooling fluid guide means are one of rails and dimples screen printed onto said flat portions.

15. In a polymer electrolyte membrane fuel cell stack comprising a plurality of polymer electrolyte membrane fuel cell units, each said fuel cell unit having a membrane-electrode-assembly comprising a proton conducting, polymer electrolyte membrane with an anode electrode film on one face and a cathode electrode film on an opposite face, an anode current collector on said anode electrode film side of said membrane-electrode-assembly and a cathode current collector on said cathode film side of said membrane-electrode-assembly, and a separator plate disposed between said anode electrode film side of said membrane-electrode-assembly of one said fuel cell unit and said cathode electrode film side of said membrane-electrode-assembly of an adjacent said fuel cell unit having guide means for distributing fuel and oxidant gases to said anode electrode film side and said cathode electrode film side and forming an anode chamber between the anode electrode film facing face of said separator plate and said anode electrode film and forming a cathode chamber between the opposite cathode electrode film facing face of said separator plate and the cathode electrode film of an adjacent said fuel cell unit, said anode chamber in gas communication with a fuel gas supply and outlet and said cathode chamber in gas communication with an oxidant gas supply and outlet, the improvement comprising:

said separator plate constructed of at least two coextensive sheet metal elements having substantially conforming non-linear shapes, said at least two coextensive sheet metal elements separated by a substantially uniform distance over their entire surfaces and forming a coolant flow space therebetween;

said separator plates having a flattened peripheral seal structure extending to contact one of said membrane-electrode-assemblies and said current collectors on each face of said separator plates completely around said anode chamber and said cathode chamber, respectively, forming a peripheral seal under cell operating conditions;

said membrane-electrode-assemblies and said separator plates each having a plurality of aligned perforations, said perforations in said separator plates being surrounded on said anode electrode film facing face and said cathode electrode film facing side by a flattened manifold seal structure extending to contact one of said membrane-electrode-assemblies and said current collectors on said anode electrode film facing sides and said cathode electrode film facing sides of said separator plates, forming a manifold seal under cell operating conditions to form a plurality of fuel gas and oxidant gas manifolds extending through said cell stack;

fuel conduits through said flattened manifold seal structure providing fuel gas communication between said fuel gas manifolds and said anode chambers on said anode electrode film facing side of said separator plates, thereby providing fully internal manifolding of fuel to and from each said fuel cell unit in said fuel cell stack; and oxidant conduits through said flattened manifold seal structure providing oxidant gas communication between said oxidant gas manifolds and said cathode chambers on said cathode electrode film facing side of said separator plates, thereby providing fully internal manifolding of oxidant to and from each said fuel cell unit in said fuel cell stack.

16. A polymer electrolyte membrane fuel cell stack in accordance with claim 15, wherein said separator plates and said membrane-electrode-assemblies form a plurality of aligned coolant fluid openings, said openings in said separator plates being surrounded on said anode electrode film facing face and said cathode electrode film facing side by a flattened coolant fluid manifold seal structure extending to contact one of said membrane-electrode-assemblies and said current collectors on said anode electrode film facing sides and said cathode electrode film facing sides of said separator plates, forming a coolant fluid manifold seal under cell operating conditions to form a plurality of coolant fluid manifolds extending through said cell stack.

17. A polymer electrolyte membrane fuel cell stack in accordance with claim 15, wherein said at least two coextensive sheet metal elements are maintained at said substantially uniform distance from each other by a plurality bumps embossed onto a sheet metal element facing face of at least one of said at least two coextensive sheet metal elements.

18. A polymer electrolyte membrane fuel cell stack in accordance with claim 15, wherein said substantially uniform distance between said at least two sheet metal elements is in a range of about 0.002 inches to about 0.010 inches.

19. A polymer electrolyte membrane fuel cell stack in accordance with claim 15, wherein said at least two sheet metal elements are constructed of a material selected from the group consisting of nickel, stainless steel, high alloy steel, titanium, and metals coated to prevent corrosion.

* * * * *